United States Patent [19]

Novak

[11] Patent Number: 5,588,599
[45] Date of Patent: Dec. 31, 1996

[54] METHOD OF MANUFACTURE OF POLYESTER-CHIP PRODUCTS FOR CASTING ARTIFICIAL-STONE ARTICLES

[76] Inventor: James P. Novak, 4625 S. 3rd Ave., Tucson, Ariz. 85714

[21] Appl. No.: 304,148

[22] Filed: Sep. 12, 1994

[51] Int. Cl.⁶ .......................... B02C 19/00; B02C 19/12
[52] U.S. Cl. .................... 241/23; 241/24.28; 241/29
[58] Field of Search .................. 241/22, 23, 29, 241/24.28

[56] References Cited

U.S. PATENT DOCUMENTS

| | | | |
|---|---|---|---|
| 3,388,196 | 6/1968 | Farrell | 264/75 |
| 3,488,246 | 1/1970 | Duggins | 161/19 |
| 3,843,060 | 10/1974 | Colburn | 241/24 |
| 3,906,065 | 9/1975 | Schneider et al. | 264/40 |
| 3,966,672 | 6/1976 | Gaylord | 241/23 X |
| 4,128,689 | 12/1978 | Heaps et al. | 428/311 |
| 4,544,584 | 10/1985 | Ross et al. | 428/15 |
| 5,269,991 | 12/1993 | Gueret | 264/73 |
| 5,482,216 | 1/1996 | Hess | 241/23 |

*Primary Examiner*—John M. Husar
*Attorney, Agent, or Firm*—Antonio R. Durando

[57] ABSTRACT

A method for preparing resin chips for use as an intermediate product in the manufacture of artificial-granite and artificial-stone articles. The process consists of mixing a thermoplastic polyester-resin material with an alumina tri-hydrate (ATH) filler and with a pigment, if desired, in a heated extruder to produce a continuous stream of thermoplastic agglomerate. This product is allowed to cool, then it is cut, ground and screened to a predetermined size, as required to meet the size characteristics of the desired resin-chip product. The undersize fines produced by the grinding operation are recycled as thermoplastic feedstock to the extruder. The resin-chip material so produced may be further mixed with a filler, as required for a particular application, and packaged for sale to commercial users.

12 Claims, 2 Drawing Sheets

METHOD OF MANUFACTURE OF POLYESTER-CHIP PRODUCTS FOR CASTING ARTIFICIAL-STONE ARTICLES

BACKGROUND OF THE INVENTION

1. Field of the Invention

This invention is related in general to synthetic compositions and processes for simulating granite and other natural stones in the manufacture of household fixtures and similar articles. In particular, the invention is directed to a new method for producing polyester-chip products such as currently used in the industry for casting such articles by conventional thermosetting molding procedures or by other methods.

2. Description of the Prior Art

With the advent of synthetic materials, many processes and compositions have been developed during the last several decades for simulating granite and other stones in the construction of fixtures and other articles such as sinks, counter tops and miscellaneous decorative objects. The particular compositions and processes used have depended in large part on the specific characteristics of the material being simulated, with different fillers and additives being introduced to match the desired appearance and texture of the final product.

Several patents describe different approaches to simulating natural stone. For Example, U.S. Pat. No. 3,488,248 issued to Duggins (1970) discloses a process for making artificial marble based on the extrusion of a flowing, high-viscosity, polymerizing material in which at least one discrete, separately identifiable, continuous phase of a low-viscosity polymerizing material is distributed. The flowing mixture is then cast to form the desired article of manufacture having the color and streak characteristics resulting from the intermediate extrusion step.

In U.S. Pat. No. 3,906,065 (1975), Schneider et al. describe a process for making marbled products using thermoplastic resin powders as the initial raw material. Two separate batches of such powder are mixed with a plasticizer, a stabilizer, a filler and a dye, and are heated to produce two differently-colored, flowable thermoplastic agglomerates. The agglomerates are then fed in controlled ratios to an extruder that produces a castable stream of marble-like mixture for forming the desired-shaped marbled product.

In U.S. Pat. No. 4,544,584 (1985), Ross et al. disclose a method for manufacturing synthetic onyx using thermosetting organic resins. A prehardened particulate phase of desired color and characteristics is mixed with a hardenable liquid phase and subjected to thermosetting in situ to produce an agglomerate of like hardness. The patent discloses thermosetting polyester resins as preferred for onyx simulation.

Finally, in U.S. Pat. No. 5,269,991 (1993), Gueret illustrates a process for making mouldings having the appearance of natural stones. The process combines a thermoplastic resin matrix with fillers based on various fibers with different grain sizes. The mixture is prepared to approximate the appearance of the desired final product and is treated by a conventional thermoplastic forming process, such as by extrusion, injection or other moulding procedures, and then cast into the desired shade. Several thermoplastic resins are disclosed, polypropylene being preferred.

None of the processes described in these patents is actually used in significant scale in the construction-fixture industry. For the most part, current commercial practice consists of utilizing a ready-made synthetic-resin chip or chip/filler mixture as raw material for casting the desired article in a mold, typically by a thermosetting process. The solid resin chip or mixture may be blended with other chips of different colors and/or with additional fillers, and the resulting dry mixture is then combined with liquid polyester resin in the presence of an appropriate thermosetting catalyst for casting or pouring in a mold, or for spraying for setting onto a surface.

Prevalent in the market is the use of a chip mixture formulated on the basis of thermosetting polyester-resin material. As illustrated schematically in FIG. 1, the chip mixture is prepared by mixing a thermosetting resin, such as the unsaturated polyester resin sold under the registered trademark "Polylite" by Reichhold Chemical, Inc. of Jacksonville, Fla., with a filler material, pigments and a resin catalyst, and by pouring the resulting agglomerate in casting molds where it is allowed to react and solidify into homogeneous ingots or blocks. The molded blocks are then removed from the molds, ground to produce a chip of a predetermined size distribution, typically between 0.5 mm and 5 mm in average size, and possibly screened. This chip product is then sold, either as is or mixed with additional filler material, to commercial consumers for casting, pouring or spraying into final products as outlined above.

The present invention is directed at improving the latter process of preparing the resin chip sold to consumers for casting into final products. Typically, the conventional method of preparation outlined above produces between 15 and 30 percent by weight of fines below the acceptable size for utilization in chip form. Because of the thermosetting nature of the polyester resin utilized, this material cannot be recast and can only be reused as colored filler material; therefore, it becomes a process byproduct that is often wasted. In addition, the method requires the use of molds that need to be cleaned and waxed between batch operations, thereby limiting throughput and efficiency.

All of these factors materially affect the cost of production of the resin-chip material used by commercial manufacturers for final casting of molded artificial-stone products. Therefore, there still exists a need for a method of producing resin chip that reduces byproduct waste and operating costs.

BRIEF SUMMARY OF THE INVENTION

In view of the aforementioned shortcomings of the conventional method of production, one objective of this invention is a process that eliminates or at least greatly reduces byproduct waste.

Another goal of the invention is a process that does not require the use of molds as an intermediate step for forming agglomerate block prior to grinding into chips, thereby simplifying the procedure and eliminating the expense of handling molds.

Yet another goal is a method that can be practiced on a continuous basis.

A final objective is a process that can be implemented easily and economically to produce resin-chip product according to the above stated criteria. This is achieved by using commercially available materials and manufacturing equipment, modified only to the extent necessary to fit the requirements of the invention.

Therefore, according to these and other objectives, the present invention consists of mixing a thermoplastic polyester-resin material with an alumina tri-hydrate (ATH) filler and with a pigment, if desired, in a heated extruder to produce a continuous stream of thermoplastic agglomerate. This product is allowed to cool, then it is cut, ground and screened to a predetermined size, as required to meet the size characteristics of the desired resin-chip product. The undersize fines produced by the grinding operation are recycled as thermoplastic feedstock to the extruder. The resin-chip material so produced may be further mixed with a filler, as required for a particular application, and packaged for sale to commercial users.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

The main inventive concepts of this disclosure concern the use of thermoplastic polyester resins, rather than thermosetting resins; the formation of a resin/filler agglomerate by continuous extrusion, rather than by batch casting in individual molds; and the recycling of undersize byproduct as feedstock to the extruder operation. In addition to minimizing waste and permitting continuous operation, this process produces a resin-chip product that is suitable for conventional casting by thermosetting methods as well as forming by further thermoplastic procedures.

In an effort to select a thermoplastic resin suitable for agglomeration with fillers and dyes by extrusion so that byproduct fines from subsequent crushing and screening could be recycled, all thermoplastic resins commonly available in commerce were tested. I discovered that thermoplastic polyesters are the only resins with the physical characteristics required to produce a chip useful for simulating artificial granite and stone products. Other thermoplastic resins, such as polyethylene, polypropylene, polystyrene, acrylic, acrylonitrile-butadienestyrene (ABS), and polyvinyl chloride do not have the required mechanical and thermal properties for efficient grinding into chips at room temperature. Moreover, the extrusion characteristics of other thermoplastic resins are not compatible for mixing with fillers such as ATH in an extruder to form a homogeneous agglomerate.

Figure 1:
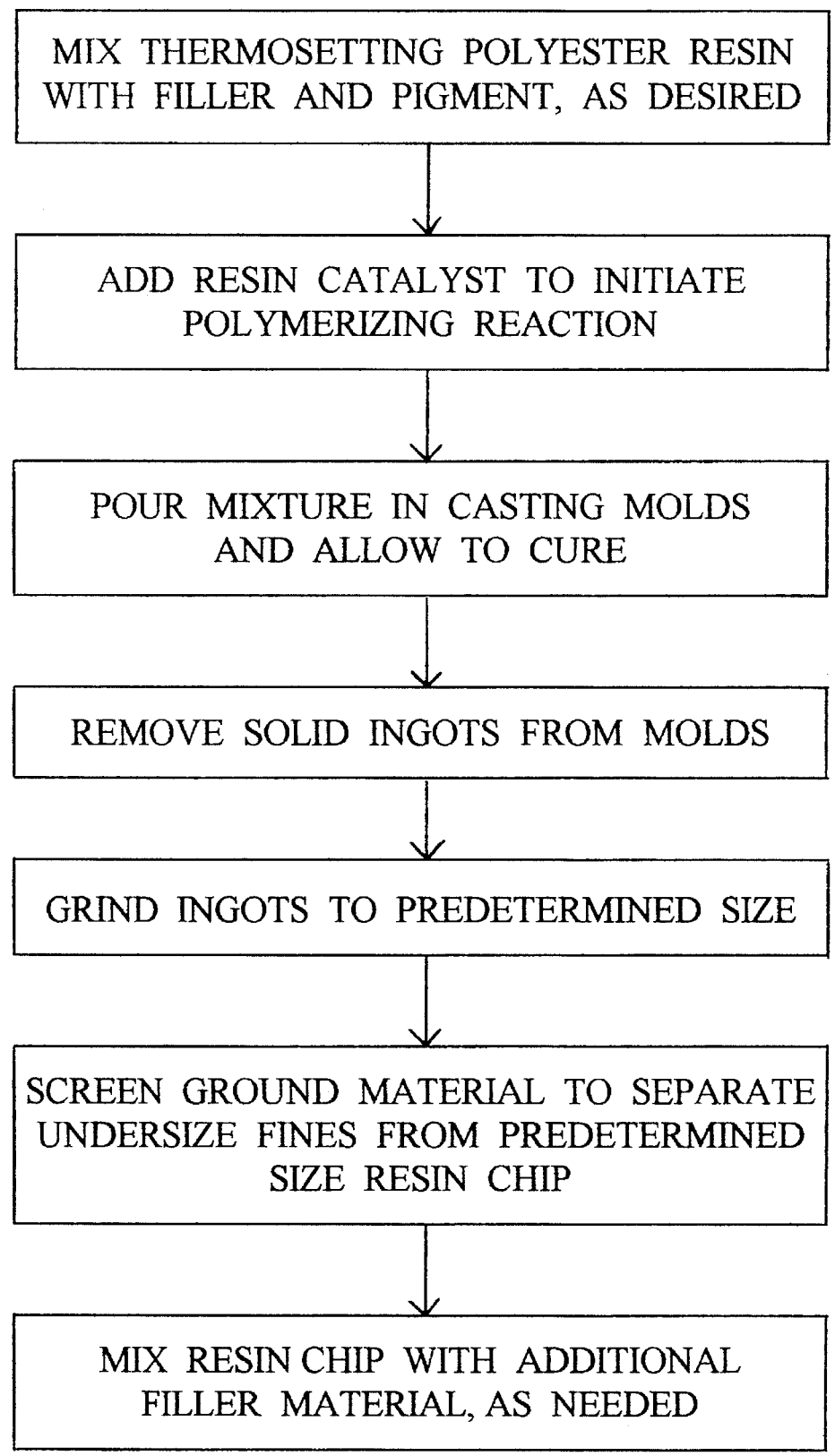
FIG. 1 is a schematic representation of the steps involved in the prior-art process of producing resin-chip material for casting artificial-stone and artificial-granite products.
Figure 2:
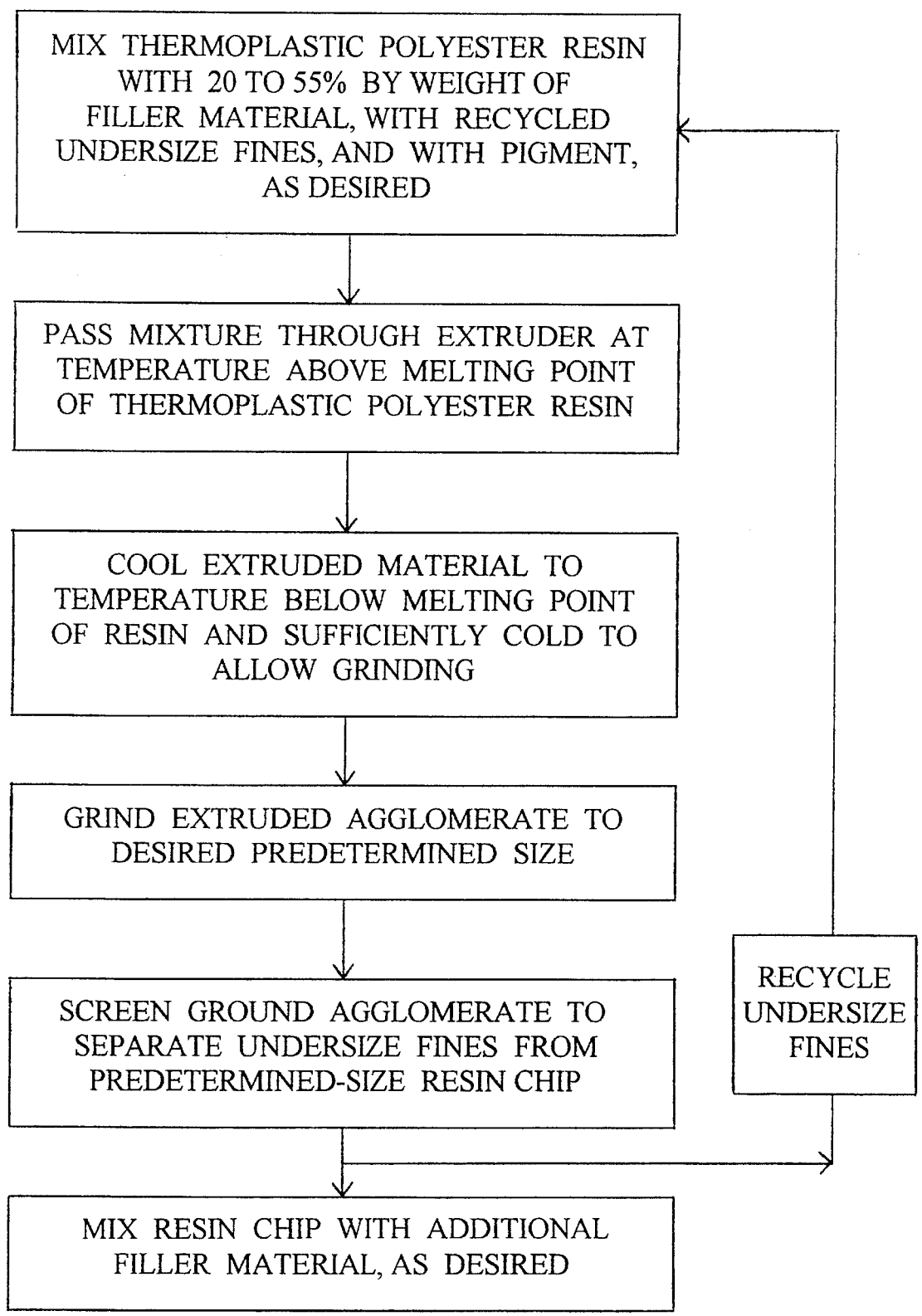
FIG. 2 is a schematic representation of the steps involved in the process of the invention.

Accordingly, as shown in schematic form in FIG. 2, the process of the present invention consists of mixing a thermoplastic polyester resin with from 20 to 55 weight percent of a filler material and with pigments in a conventional extruder, to which a fines recycle stream may also be added, as detailed below. The mixture is heated under pressure to a temperature above the melting point of the resin to produce the at least partial fluxing thereof. Pigments or other additives may also be added as desired for appearance. As the mixture is passed through the extruder, the resin becomes completely melted and the filler and pigment are distributed evenly to produce a substantially homogeneous fluid mass. Obviously, the extruding temperature must not be so high as to cause damage to the various constituents.

All thermoplastic polyester resins available in commerce, poly(ethylene terephthalates), normally called PET's, and poly(butylene terephthalates), PBT's, have been found to yield satisfactory results for the invention, PBT's being preferred. Alumina tri-hydrate filler (ATH) is the preferred filler material. With these materials, a standard extruder operated at a temperature above the melting point of the resin (typically about 220° C. to 250° C.) and at an inlet pressure sufficient to yield the desired throughput produces a flowing stream of agglomerate in the form of individual strings. Obviously, the fluid agglomerate so produced is allowed to cool at least to a temperature (below the melting point) at which it can be ground into chips of a predetermined size. I found that any temperature below 70° C. is adequate for the grinding operation, but ambient temperature is preferred because it minimizes operating controls in the sequence of production.

In order to facilitate the grinding process, the string-like extruder output is first cut into individual pellet-like pieces and then fed to a conventional grinder, such as an Andritz Sprout Bauer disc mill. The size reduction required to produce the desired chip product obviously depends on the ultimate application. A nonhomogeneous multicolor granite may require larger chips than a uniform stone; therefore, the grinding and sizing steps must be tailored to the particular application at hand. The ground material is then screened to separate the acceptable-size chip product from undersize fines. Finally, these fines are recycled and combined to the resin and filler as feedstock to the extruder. In a continuous operation running at steady state, the composition of the recycled material is necessarily the same as the combination of the raw-material constituents fed to the extruder (i.e., resin, filler and pigments). Therefore, the recycled stream can be fed in any percentage of total feedstock (from zero to 100 percent) without materially affecting the operation.

Thus, a chip product of a predetermined size is manufactured and all undersize fines may be reprocessed in the same continuous operation. This option eliminates waste and substantially reduces production costs. Note that when a typical-size chip (about 1 mm, passing through a 16 mesh Tyler screen) is produced in batches with a thermosetting resin and ground to size, a normal fines production rate is from 15 to 30 weight percent. All of this throughput can be advantageously reutilized directly by the process of the present invention.

In the course of implementing the concepts of this invention, I also discovered that the dust produced during the grinding operation is greatly reduced when compared to the amounts generated from grinding thermoset polyester ingots. In addition, it is known that thermosetting polyester resins have a certain amount of carcinogenic toxicity, as shown by published data sheets, that is not reported for thermoplastic polyesters. Therefore, this is an additional advantage inherent in the method of this invention.

It is noted that the resin-chip product resulting from the disclosed process may be used directly in a subsequent thermoplastic or thermosetting process for producing fixtures and other articles; or it may first be mixed with resin chips of other colors, or with one or more additional fillers to provide the balance of color and texture ultimately desired. Prevalently, the resin chip produced by the thermoplastic extrusion of the invention is mixed with about 50 to 90 weight percent (70% being most common) of additional filler, such as ATH, and is bagged for shipment to commercial users.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A method for preparing resin chips for use as an intermediate product in the manufacture of artificial-granite and artificial-stone articles, comprising the following steps:

(a) mixing a thermoplastic polyester resin with a filler material in predetermined proportions and feeding the resulting mixture through a heated extruder at a temperature sufficiently high to melt the thermoplastic polyester resin;

(b) cooling the output from the extruder to a temperature below a melting point of the thermoplastic polyester resin to produce a solid material;

(c) grinding said solid material to produce resin chips of a predetermined particle size;

(d) screening said resin chips of a predetermined particle size to separate them from undersize fines of resin material; and (e) recycling at least a portion of said undersize fines as feedstock to the extruder in step (a).

2. The method recited in claim 1, wherein said filler material consists of alumina tri-hydrate.

3. The method recited in claim 1, wherein said thermoplastic polyester resin is selected from the group consisting of poly(ethylene terephthalates), poly(butylene terephthalates), and mixtures thereof.

4. The method recited in claim 3, wherein said filler material consists of alumina tri-hydrate.

5. The method recited in claim 1, wherein in step (a) said thermoplastic polyester resin is mixed with approximately 20 to 55 weight percent of a filler material.

6. The method recited in claim 5, wherein said thermoplastic polyester resin is selected from the group consisting of poly(ethylene terephthalates), poly(butylene terephthalates), and mixtures thereof.

7. The method recited in claim 6, wherein said filler material consists of alumina tri-hydrate.

8. The method recited in claim 5, further comprising the step of mixing said resin chips of a predetermined particle size with additional filler material after step (d).

9. The method recited in claim 1, further comprising the step of mixing said resin chips of a predetermined particle size with additional filler material after step (d).

10. The method recited in claim 9, wherein said filler material consists of alumina tri-hydrate.

11. The method recited in claim 10, wherein said thermoplastic polyester resin is selected from the group consisting of poly(ethylene terephthalates), poly(butylene terephthalates), and mixtures thereof.

12. The method recited in claim 11, wherein said filler material consists of alumina tri-hydrate.

* * * * *